(12) United States Patent
Blackwell et al.

(10) Patent No.: US 7,934,830 B2
(45) Date of Patent: May 3, 2011

(54) HIGH WATER CONTENT SILICONE HYDROGELS

(75) Inventors: Richard I. Blackwell, Webster, NY (US); Jay F. Kunzler, Canandaigua, NY (US); Amy Jasek, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 246 days.

(21) Appl. No.: 12/267,660

(22) Filed: Nov. 10, 2008

(65) Prior Publication Data

US 2009/0141234 A1 Jun. 4, 2009

Related U.S. Application Data

(60) Provisional application No. 60/991,783, filed on Dec. 3, 2007.

(51) Int. Cl.
*G02C 7/04* (2006.01)

(52) U.S. Cl. ............... 351/160 H; 351/160 R; 523/106; 523/107; 428/447; 526/279

(58) Field of Classification Search .......... 351/159, 351/160 H, 160 R, 177; 526/260, 264, 279, 526/284; 524/542, 588; 528/32, 37; 523/106, 523/107, 113; 427/2.1, 2.24, 162, 397.7, 427/387, 430.1, 533, 569; 428/221, 411.1, 428/420, 421, 446, 447, 533

See application file for complete search history.

(56) References Cited

U.S. PATENT DOCUMENTS

| | | | |
|---|---|---|---|
| 3,408,429 A * | 10/1968 | Wichterle | |
| 3,660,545 A * | 5/1972 | Wichterle | |
| 4,113,224 A * | 9/1978 | Clark et al. | |
| 4,136,250 A * | 1/1979 | Mueller et al. | |
| 4,153,641 A * | 5/1979 | Deichert et al. | |
| 4,197,266 A * | 4/1980 | Clark et al. | |
| 4,740,533 A * | 4/1988 | Su et al. | |
| 4,997,897 A * | 3/1991 | Melpolder | |
| 5,034,461 A * | 7/1991 | Lai et al. | |
| 5,070,215 A * | 12/1991 | Bambury et al. | |
| 5,260,000 A * | 11/1993 | Nandu et al. | |
| 5,271,875 A * | 12/1993 | Appleton et al. | |
| 5,310,779 A * | 5/1994 | Lai | |
| 5,358,995 A * | 10/1994 | Lai et al. | |
| 5,959,117 A * | 9/1999 | Ozark et al. | 548/110 |
| 5,962,548 A * | 10/1999 | Vanderlaan et al. | 523/107 |
| 5,981,675 A * | 11/1999 | Valint et al. | 526/279 |
| 5,998,498 A * | 12/1999 | Vanderlaan et al. | 523/107 |
| 6,274,133 B1 * | 8/2001 | Hu et al. | 424/78.04 |
| 6,762,264 B2 * | 7/2004 | Kunzler et al. | 526/279 |
| 6,921,802 B2 * | 7/2005 | Kunzler et al. | 528/32 |
| 7,268,198 B2 * | 9/2007 | Kunzler | |

FOREIGN PATENT DOCUMENTS

| | | |
|---|---|---|
| EP | 0396364 | 11/1990 |
| EP | 0762149 | 3/1997 |
| WO | WO 95/09878 | 4/1995 |
| WO | WO 96/31792 | * 10/1996 |

OTHER PUBLICATIONS

International Search Report (PCT/ISA/210) and Written Opinion (PCT/ISA/237) mailed on Feb. 5, 2009.
William J. Benajmin et al., "The Oxygen Permeability of Reference Materials," Optom Vis Sci, (vol. 74), (Issue. 12s), (p. 95), (Oct. 1, 1997).

* cited by examiner

*Primary Examiner* — Loha Ben
(74) *Attorney, Agent, or Firm* — Glenn D. Smith; M. Carman & Associates, PLLC

(57) ABSTRACT

Silicone hydrogels formed from a hydrated polymerization product of a monomer mixture comprising (a) a major amount of a non-silicone-containing hydrophilic monomer; and (b) a minor amount of a silicone-containing monomer, wherein the hydrogel has a water content of greater than 50 weight percent are disclosed.

26 Claims, No Drawings

HIGH WATER CONTENT SILICONE HYDROGELS

PRIORITY CLAIMS TO PRIOR APPLICATIONS

This application claims the benefit of Provisional Patent Application No. 60/991,783 filed Dec. 3, 2007.

BACKGROUND OF THE INVENTION

1. Technical Field

The present invention generally relates to high water content silicone hydrogel materials.

2. Description of the Related Art

Hydrogels represent a desirable class of materials for contact lenses. A hydrogel is a hydrated cross-linked polymeric system that contains water in an equilibrium state. Hydrogel lenses offer relatively high oxygen permeability as well as desirable biocompatibility and comfort.

Oxygen permeability (Dk) is one important factor in contact lens design to maintain ocular health for contact lens wearers. For example, a contact lens must allow oxygen to reach the cornea in an amount which is sufficient for long-term corneal health. The contact lens must also allow oxygen from the surrounding air to reach the cornea because the cornea does not receive oxygen from the blood supply like other tissue. "Soft" contact lenses conform closely to the shape of the eye, so oxygen cannot easily circumvent the lens. Thus, soft contact lenses must allow oxygen to diffuse through the lens to reach the cornea.

Another ophthalmic compatibility requirement for soft contact lenses is that the lens must not strongly adhere to the eye. Clearly, the consumer must be able to easily remove the lens from the eye for disinfecting, cleaning, or disposal. However, the lens must also be able to move on the eye in order to encourage tear flow between the lens and the eye. Tear flow between the lens and eye allows for debris, such as foreign particulates or dead epithelial cells, to be swept from beneath the lens and, ultimately, out of the tear fluid. Thus, a contact lens must not adhere to the eye so strongly that adequate movement of the lens on the eye is inhibited.

In order to balance the ophthalmic compatibility and consumer comfort requirements in designing a daily wear soft contact lens, high water content conventional hydrogel contact lenses composed of copolymers of hydrophilic monomers such as 2-hydroxyethyl methacrylate) (HEMA), N-vinylpyrrolidone and the like, and prepared by lathe-cutting methods, spin casting methods, cast molding methods or combinations thereof, followed by a swelling treatment in a physiological saline and/or phosphate buffer solution to obtain lenses with water contents of about 20% to about 80% by weight were developed. These hydrophilic polymers move well on the eye and provide sufficient oxygen permeability for daily wear.

Prior art soft silicon-containing hydrophilic contact lenses with higher water contents tend to have reduced or lower oxygen permeabilities. For example, a silicone hydrogel contact lens available under the tradename, Focus Night & Day (available from CIBA Vision Corporation), has a water content of about 24% and a Dk of about 140 Barrers. Another silicone hydrogel contact lens available under the tradename, O2 Optix (available from CIBA Vision Corporation), has a water content of about 33% and a Dk of about 110 Barrers. Another silicone hydrogel contact lens available under the tradename, Acuvue Oasys (available from Johnson & Johnson), has a water content of about 38% and a Dk of about 105 Barrers. Another silicone hydrogel contact lens available under the tradename, PureVision (available from Bausch & Lomb), has a water content of about 36% and a Dk of about 100 Barrers. Another silicone hydrogel contact lens available under the tradename, Acuvue Advance (available from Johnson & Johnson), has a water content of about 46 to 47% and a Dk of about 65 Barrers. In comparison, a non-silicone hydrogel contact lens available under the tradename, Acuvue2 (available from Johnson & Johnson), has a water content of about 58% and a Dk of about 25 Barrers.

U.S. Pat. No. 5,260,000 discloses a process for preparing silicone hydrogel contact lenses, where silicone hydrogel contact lenses are cast from monomeric mixtures including a major amount of a silicone-containing monomer, a hydrophilic monomer and n-nonanol or n-hexanol as a diluent, and subsequently extracted with isopropanol to remove any remaining diluent as well as unreacted monomers and oligomers. However, problems associated with the manufacturing of low cost lenses from silicone hydrogels include the need for a solvent extraction step in the manufacturing process to remove any unreacted silicone as well as the need to perform a post-polymerization surface modification step(s) to provide a wettable, lubricious and low-fouling surface.

U.S. Pat. No. 7,268,198 ("the '198 patent") discloses a silicone hydrogel that is the hydrated polymerization product of a monomer mixture comprising a hydrophilic monomer selected from the group consisting of N-vinyl-N-methyl acetamide, N-vinyl-N-ethyl acetamide, N-vinyl-N-ethyl formamide, N-vinyl formamide, N-vinyl pyrrolidone and mixtures thereof, and a polysiloxane-containing monomer, wherein the hydrogel has an oxygen permeability of at least about 120 Barrers and a modulus from 40 to 57 g/mm$^2$. However, each of the examples in the '198 patent form a silicone hydrogel having a water content between 19.2% and 35.3%.

It would be desirable to provide improved high water content silicone hydrogels.

SUMMARY OF THE INVENTION

In accordance with one embodiment of the present invention, a silicone hydrogel formed from the hydrated polymerization product of a monomer mixture comprising (a) a major amount of a non-silicone-containing hydrophilic monomer; and (b) a minor amount of a silicone-containing monomer, wherein the hydrogel has a water content of greater than 50 weight percent is provided.

In accordance with a second embodiment of the present invention, a silicone hydrogel formed from the hydrated polymerization product of a monomer mixture comprising (a) a major amount of a non-silicone-containing hydrophilic monomer; and (b) a minor amount of a silicone-containing monomer, wherein the hydrogel has a water content of greater than 70 weight percent and an oxygen permeability of about 30 to about 70 Barrers is provided.

In accordance with a second embodiment of the present invention, a contact lens is provided comprising a silicone hydrogel formed from the hydrated polymerization product of a monomer mixture comprising (a) a major amount of a non-silicone-containing hydrophilic monomer; and (b) a minor amount of a silicone-containing monomer, wherein the hydrogel has a water content of greater than 50 weight percent.

By employing a minor amount of a silicone-containing monomer to a base material comprising a major amount of a non-silicone-containing hydrophilic monomer in the preparation of a silicone hydrogel, the silicone-containing monomer will have substantially no effect on the properties of the bulk material (e.g., oxygen permeability, water content, modulus, etc.) and surface properties (e.g., wettability, lubricity, etc.) thereof. In addition, the silicone hydrogels of the present invention can advantageously be formed with a desirable hydrophilic surface and high water content without any solvent extraction or post-polymerization surface treatment steps while also having suitable oxygen permeability properties. In this manner, a silicone hydrogel can be manufactured in a relatively efficient process and on a low-cost platform.

DETAILED DESCRIPTION OF THE PREFERRED EMBODIMENTS

The present invention is directed to silicone hydrogels formed from the hydrated polymerization product of a monomer mixture comprising (a) a major amount of a non-silicone-containing hydrophilic monomer; and (b) a minor amount of a silicone-containing monomer, wherein the hydrogel has a water content of greater than 50 weight percent. As used herein, the term "monomer" denotes relatively low molecular weight compounds that are polymerizable by free radical polymerization, as well as higher molecular weight compounds also referred to as "prepolymers", "macromonomers", and similar terms.

Suitable non-silicone-containing hydrophilic monomers include, but are not limited to, unsaturated carboxylic acids, such as (meth)acrylic acids; (meth)acrylic substituted alcohols, vinyl lactams, (meth)acrylamides and the like. As used herein, the term "(meth)" denotes an optional methyl substituent. Thus, terms such as "(meth)acrylate" denotes either methacrylate or acrylate, and "(meth)acrylamide" denotes either methacrylamide or acrylamide. Specific examples of non-silicone-containing hydrophilic monomers include methacrylamide, N-methylmethacrylamide, N,N-dimethylacrylamide, N,N-dimethylmethylacrylamide, glyceryl methacrylate, N-(2-hydroxyethyl)methacrylamide, N-methacryloyl glycine; and (2-hydroxy-3-methacryloylpropyl)-4-methoxy phenylether. Preferred monomers include N,N-dimethylacrylamide, N-vinyl-2-pyrrolidone (NVP), 2-hydroxyethyl methacrylate (HEMA) and mixtures thereof.

The non-silicone-containing hydrophilic monomer is included in the monomeric mixture in a major amount (a term which is meant to include mixtures of hydrophilic monomers), i.e., an amount of at least about 50 parts by weight of total components in the monomeric mixture. In one embodiment, the non-silicone-containing hydrophilic monomer is present in the monomeric mixture in an amount ranging from about 50 to about 95 parts by weight of total monomeric mixture components with about 60 to about 90 parts by weight being especially preferred. In a preferred embodiment, the monomeric mixture will include at least about 60 parts by weight, and more preferably at least about 80 parts by weight, of total non-silicone-containing hydrophilic monomeric components so that the resultant silicone hydrogel is predominantly hydrophilic and wettable for use as a silicone hydrogel material.

The silicon-containing monomer can be any polymerizable silicon-containing monomer. The monomers may be added to the monomeric mixture from which a shaped article is obtained as monomers or prepolymers. Thus, it is understood that the terms "silicone-containing monomers" and "hydrophilic monomers" include prepolymers. For example, in one embodiment, the silicone-containing monomers can be non-ionic silicone-containing monomers. Applicable silicone-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

Representative examples of applicable silicon-containing monomeric units include bulky siloxanyl monomers represented by the structure of Formula I:

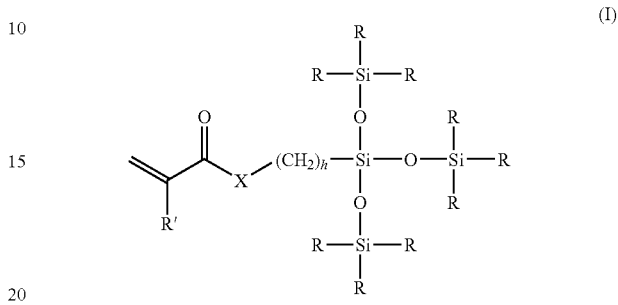

wherein X denotes —O— or —NR"—, wherein R" is hydrogen, methyl or ethyl; each R' independently denotes hydrogen or methyl; each R independently denotes a lower alkyl radical, phenyl radical or a group represented by

wherein each R'" independently denotes a lower alkyl or phenyl radical; and h is 1 to 10.

Examples of bulky monomers are 3-methacryloyloxypropyltris(trimethyl-siloxy)silane or tris(trimethylsiloxy)silylpropyl methacrylate, sometimes referred to as TRIS and tris (trimethylsiloxy)silylpropyl vinyl carbamate, sometimes referred to as TRIS-VC, pentamethyldisiloxanyl methylmethacrylate, phenyltetramethyl-disiloxanylethyl acetate, and methyldi(trimethylsiloxy)methacryloxymethyl silane and the like and mixtures thereof. In one embodiment, the silicone-containing monomer is a tris(trialkylsiloxy)silylalkyl methacrylate-containing monomer such as a tris(trimethylsiloxy)silylpropyl methacrylate-containing monomer.

Such bulky monomers may be copolymerized with a silicone macromonomer, such as a poly(organosiloxane) capped with an unsaturated group at two or more ends of the molecule. U.S. Pat. No. 4,153,641 discloses, for example, various unsaturated groups such as acryloyloxy or methacryloyloxy groups.

Another class of representative silicone-containing monomers includes, but is not limited to, silicone-containing vinyl carbonate or vinyl carbamate monomers such as, for example, 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy)silane]; 3-[tris (trimethylsiloxy)silyl]propyl vinyl carbamate; 3-[tris (trimethylsiloxy)silyl]propyl allyl carbamate; 3-[tris (trimethylsiloxy)silyl]propyl vinyl carbonate; t-butyldimethylsiloxyethyl vinyl carbonate; trimethylsilylethyl vinyl carbonate; trimethylsilylmethyl vinyl carbonate, "V$_2$D$_{25}$" of the general formula

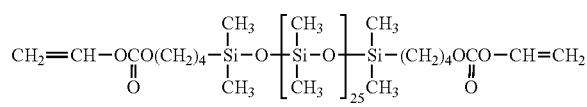

and the like and mixtures thereof.

Another class of silicon-containing monomers includes polyurethane-polysiloxane macromonomers (also sometimes referred to as prepolymers), which may have hard-soft-hard blocks like traditional urethane elastomers. They may be end-capped with a hydrophilic monomer such as 2-hydroxyethyl methacrylate (HEMA). Examples of such silicone urethanes are disclosed in a variety or publications, including PCT Published Application No. WO 96/31792 discloses examples of such monomers, which disclosure is hereby incorporated by reference in its entirety. Representative examples of silicone urethane monomers are represented by Formulae II and III:

$$E(*D*A*D*G)_a*D*A*D*E'; \text{ or} \quad (II)$$

$$E(*D*G*D*A)_a*D*A*D*E'; \text{ or} \quad (III)$$

wherein:

D independently denotes an alkyl diradical, an alkyl cycloalkyl diradical, a cycloalkyl diradical, an aryl diradical or an alkylaryl diradical having 6 to about 30 carbon atoms;

G independently denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;

* denotes a urethane or ureido linkage;

a is at least 1;

A independently denotes a divalent polymeric radical of Formula IV:

(IV)

wherein each $R^s$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;

each of E and E' independently denotes a polymerizable unsaturated organic radical represented by Formula V:

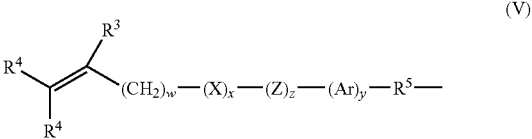

wherein: $R^3$ is hydrogen or methyl;

$R^4$ is hydrogen, an alkyl radical having 1 to 6 carbon atoms, or a —CO—Y—$R^6$ radical wherein Y is —O—, —S— or —NH—;

$R^5$ is a divalent alkylene radical having 1 to about 10 carbon atoms;

$R^6$ is a alkyl radical having 1 to about 12 carbon atoms;

X denotes —CO— or —OCO—;

Z denotes —O— or —NH—;

Ar denotes an aromatic radical having about 6 to about 30 carbon atoms;

w is 0 to 6; x is 0 or 1; y is 0 or 1; and z is 0 or 1.

A preferred silicone-containing urethane monomer is represented by Formula VI:

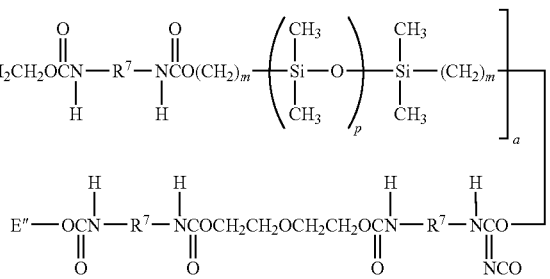

wherein m is at least 1 and is preferably 3 or 4, a is at least 1 and preferably is 1, p is a number which provides a moiety weight of about 400 to about 10,000 and is preferably at least about 30, $R^7$ is a diradical of a diisocyanate after removal of the isocyanate group, such as the diradical of isophorone diisocyanate, and each E" is a group represented by:

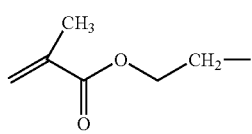

In another embodiment, the silicone-containing monomers is a cationic silicone-containing monomer. Representative examples of applicable cationic silicon-containing monomeric units include cationic monomers of Formula VII:

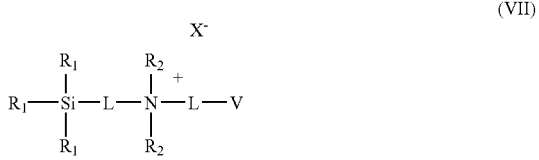

wherein each L independently can be an urethane, carbonate, carbamate, carboxyl ureido, sulfonyl, straight or branched $C_1$-$C_{30}$ alkyl group, straight or branched $C_1$-$C_{30}$ fluoroalkyl group, ester-containing group, ether-containing group, polyether-containing group, ureido group, amide group, amine group, substituted or unsubstituted $C_1$-$C_{30}$ alkoxy group, substituted or unsubstituted $C_3$-$C_{30}$ cycloalkyl group, substituted or unsubstituted $C_3$-$C_{30}$ cycloalkylalkyl group, substituted or unsubstituted $C_3$-$C_{30}$ cycloalkenyl group, substituted or unsubstituted $C_5$-$C_{30}$ aryl group, substituted or unsubstituted $C_5$-$C_{30}$ arylalkyl group, substituted or unsubstituted $C_5$-$C_{30}$ heteroaryl group, substituted or unsubstituted $C_3$-$C_{30}$ heterocyclic ring, substituted or unsubstituted $C_4$-$C_{30}$ heterocyclolalkyl group, substituted or unsubstituted $C_6$-$C_{30}$ heteroarylalkyl group, $C_5$-$C_{30}$ fluoroaryl group, or hydroxyl substituted alkyl ether and combinations thereof.

$X^-$ is at least a single charged counter ion. Examples of single charge counter ions include the group consisting of $Cl^-$, $Br^-$, $I^-$, $CF_3CO_2^-$, $CH_3CO_2^-$, $HCO_3^-$, $CH_3SO_4^-$, p-toluenesulfonate, $HSO_4^-$, $H_2PO_4^-$, $NO_3^-$, and $CH_3CH(OH)CO_2^-$. Examples of dual charged counter ions would include $SO_4^{2-}$, $CO_3^{2-}$ and $HPO_4^{2-}$. Other charged counter ions would be obvious to one of ordinary skill in the art. It should be understood that a residual amount of counter ion may be present in the hydrated product. Therefore, the use of toxic counterions is to be discouraged. Likewise, it should be understood that, for a singularly charged counterion, the ratio of counterion and quaternary siloxanyl will be 1:1. Counterions of greater negative charge will result in differing ratios based upon the total charge of the counterion.

$R_1$ and $R_2$ are each independently hydrogen, a straight or branched $C_1$-$C_{30}$ alkyl group, straight or branched $C_1$-$C_{30}$ fluoroalkyl group, $C_1$-$C_{20}$ ester group, ether containing group, polyether containing group, ureido group, amide group, amine group, substituted or unsubstituted $C_1$-$C_{30}$ alkoxy group, substituted or unsubstituted $C_3$-$C_{30}$ cycloalkyl group, substituted or unsubstituted $C_3$-$C_{30}$ cycloalkylalkyl group, substituted or unsubstituted $C_3$-$C_{30}$ cycloalkenyl group, substituted or unsubstituted $C_5$-$C_{30}$ aryl group, substituted or unsubstituted $C_5$-$C_{30}$ arylalkyl group, substituted or unsubstituted $C_5$-$C_{30}$ heteroaryl group, substituted or unsubstituted $C_3$-$C_{30}$ heterocyclic ring, substituted or unsubstituted $C_4$-$C_{30}$ heterocyclolalkyl group, a substituted or unsubstituted $C_6$-$C_{30}$ heteroarylalkyl group, fluorine group, a $C_5$-$C_{30}$ fluoroaryl group, or a hydroxyl group and V is independently a polymerizable ethylenically unsaturated organic radical.

Preferred monomers of Formula VII are shown in Formula VIII below:

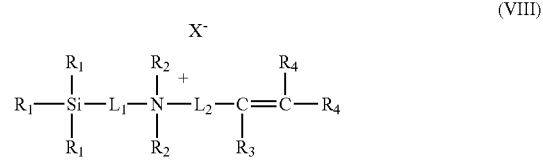
(VIII)

wherein each $R_1$ is the same and is $-OSi(CH_3)_3$, $R_2$ is methyl, $L_1$ is an alkyl amide, $L_2$ is a alkyl amide or ester having 2 or 3 carbon atoms that is joined to a polymerizable vinyl group, $R_3$ is methyl, $R_4$ is H and $X^-$ is $Br^-$ or $Cl^-$.

Further preferred structures have the following structural Formulae IX-XIII:

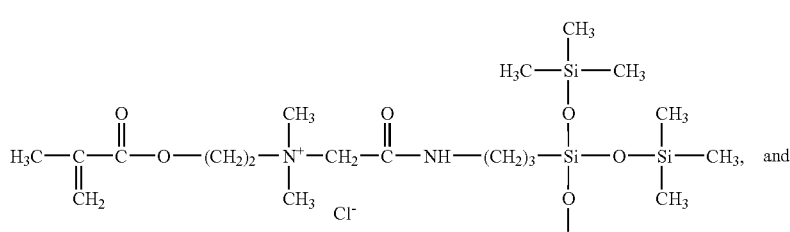
(IX)

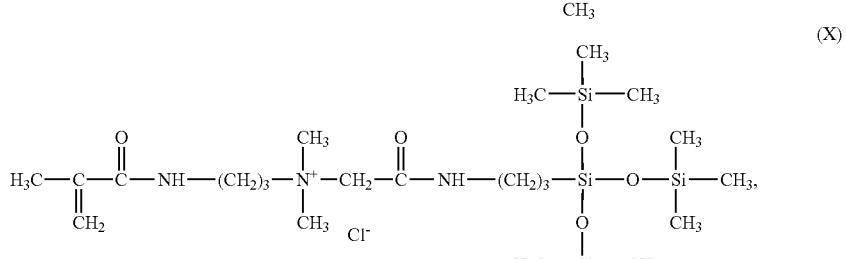
(X)

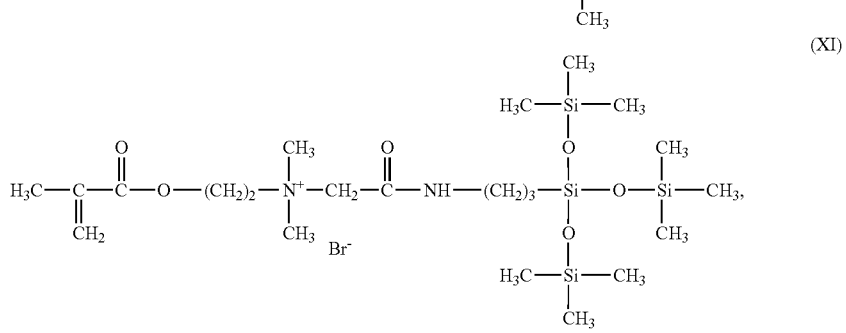
(XI)

(XII)
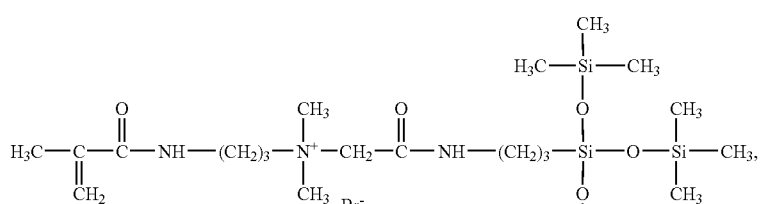
(XIII)
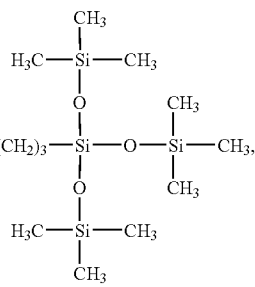
A schematic representation of synthetic methods for making a cationic silicon-containing monomer as disclosed hereinabove is provided below:
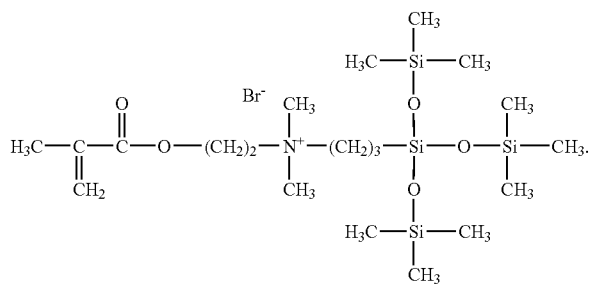
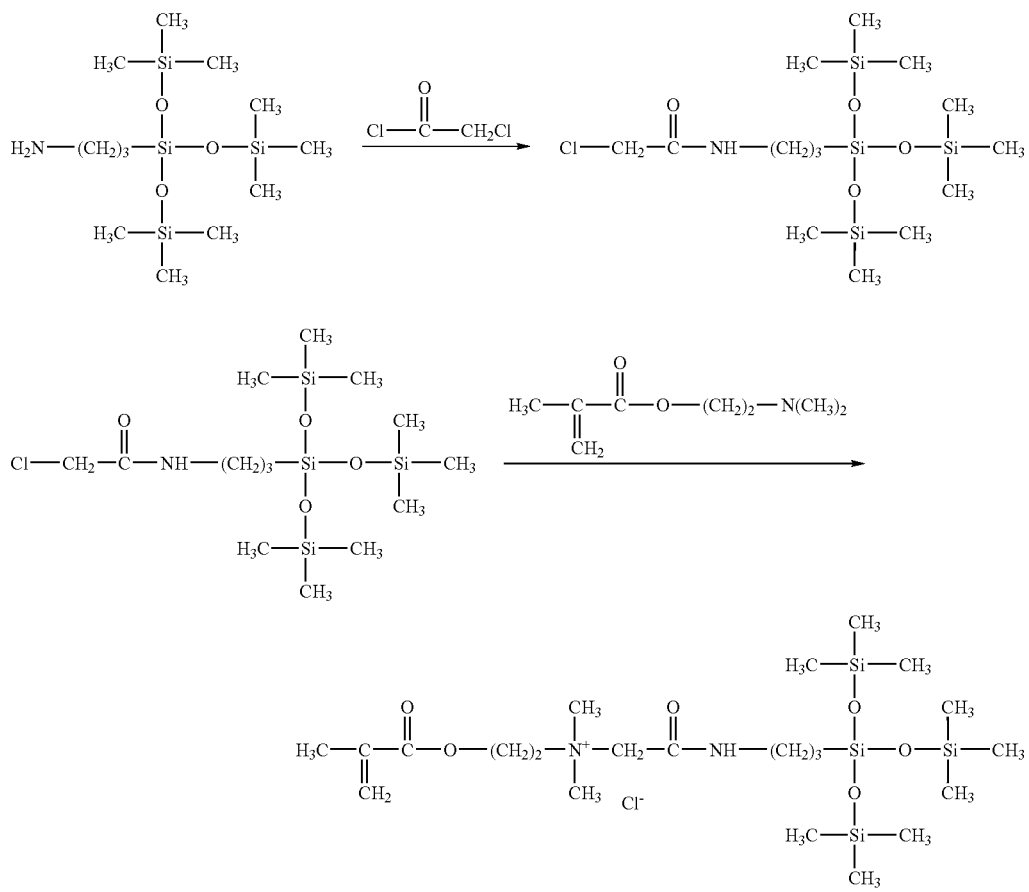

Another class of examples of applicable cationic silicon-containing monomeric units for use herein include cationic monomers of Formula XIV:

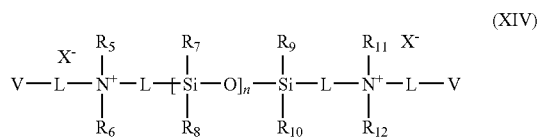
(XIV)

wherein each L can be the same or different and is as defined above for L in Formula VII; $X^-$ is at least a single charged counter ion as defined above for $X^-$ in Formula VII; $R_5$, $R_6$, $R_7$, $R_8$, $R_9$, $R_{10}$, $R_{11}$ and $R_{12}$ are each independently as defined above for $R_1$ in Formula VII; V is independently a polymerizable ethylenically unsaturated organic radical and n is an integer of 1 to about 300.

Preferred monomers of Formula XIV are shown in Formulae XV-XIX below:

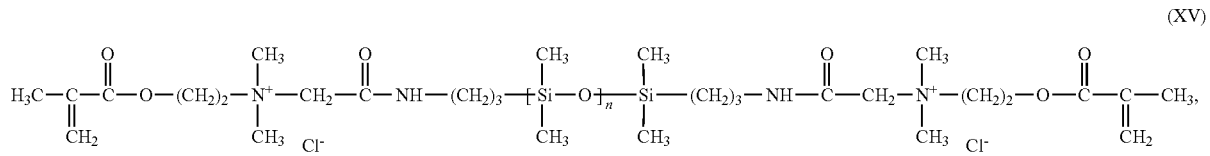
(XV)

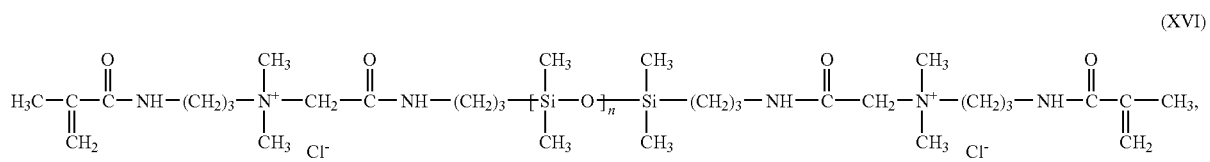
(XVI)

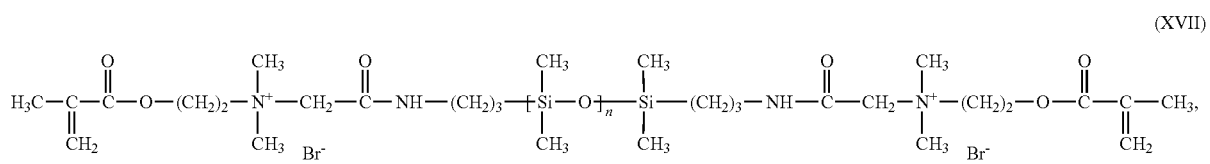
(XVII)

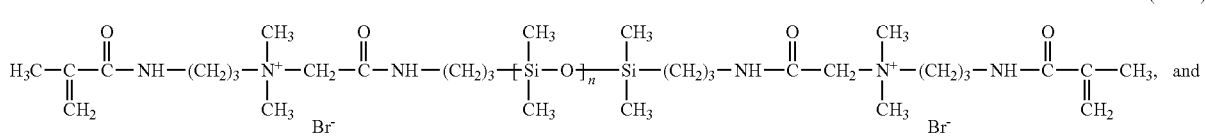
(XVIII)

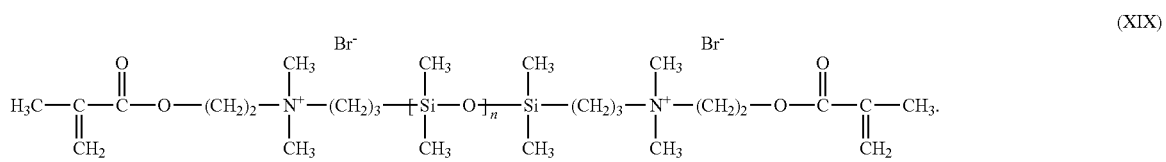
(XIX)

A schematic representation of a synthetic method for making the cationic silicon-containing monomers of Formula XIV is provided below:

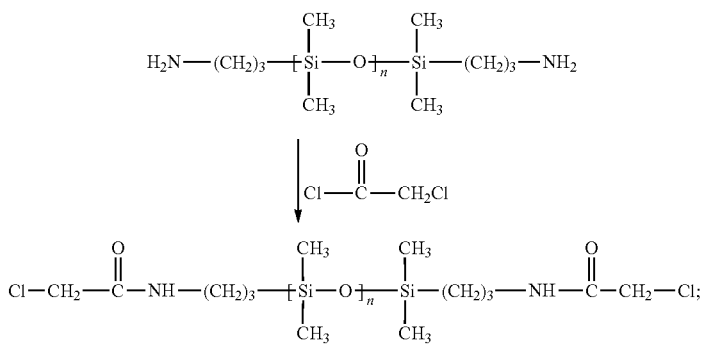

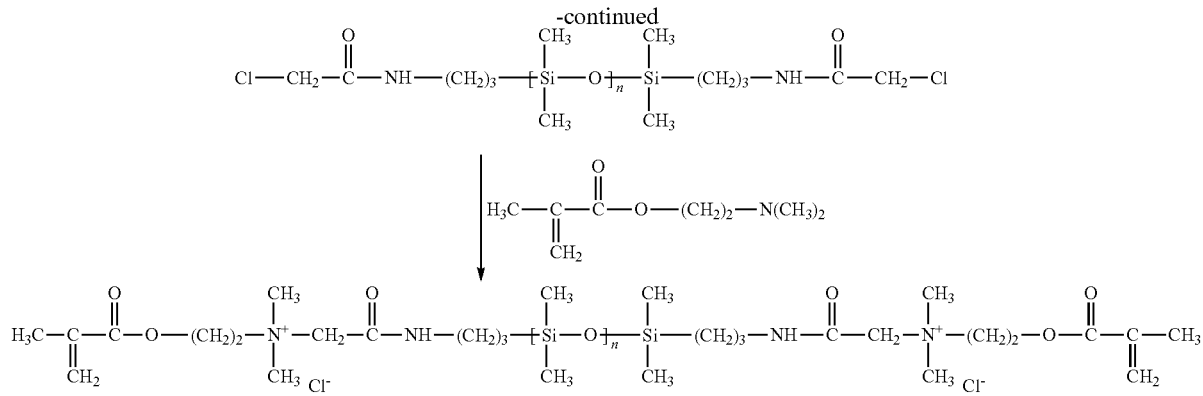

Another class of examples of applicable cationic silicon-containing monomeric units for use herein include cationic monomers of Formula XX:

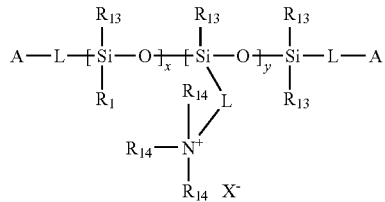

(XX)

wherein x is 0 to 1000, y is 1 to 300, each L can be the same or different and is as defined above for L in Formula VII; $X^-$ is at least a single charged counter ion as defined above for $X^-$ in Formula VII; each $R_1$, $R_{13}$ and $R_{14}$ are independently as defined above for $R_1$ in Formula VII and A is a polymerizable vinyl moiety.

A preferred cationic random copolymer of Formula XX is shown in Formula XXI below:

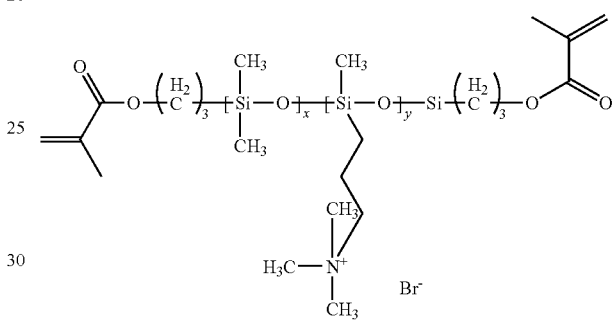

(XXI)

wherein x is 0 to 1000 and y is 1 to 300.

A schematic representation of a synthetic method for making the cationic silicon-containing random copolymers of Formulae XX and XXI is provided below:

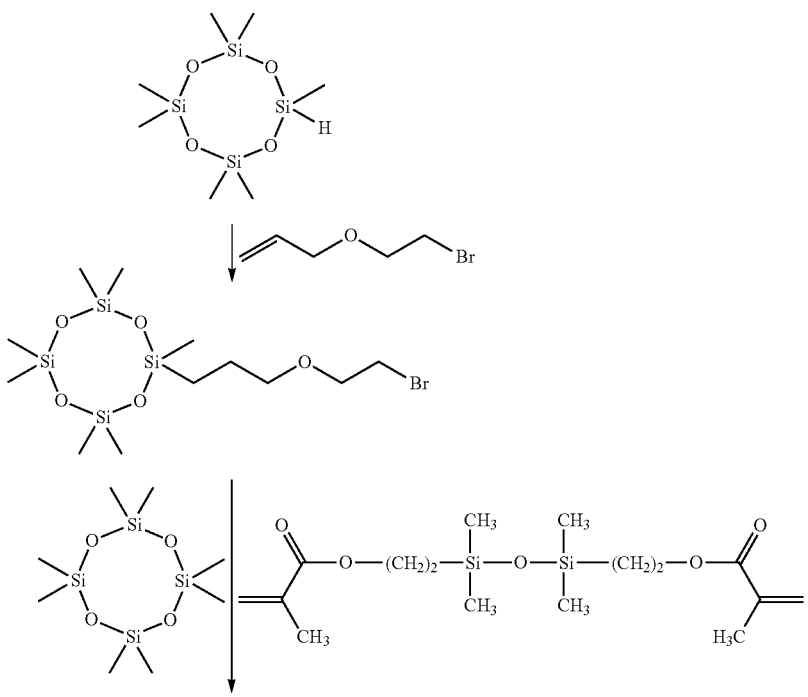

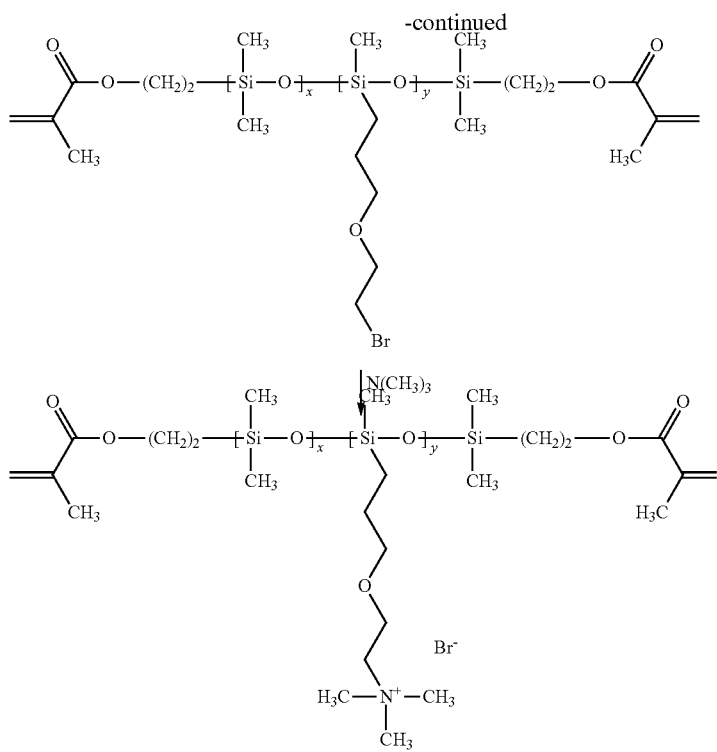

Another class of examples of applicable cationic materials for use herein include cationic random copolymers of Formula XXII:

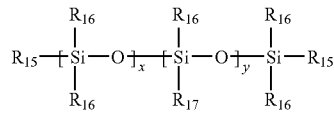 (XXII)

wherein x is 0 to 1000, y is 1 to 300; each $R_{15}$ and $R_{16}$ can be the same or different and can be the groups as defined above for $R_1$ in Formula VII; $R_{17}$ is independently one or more of the following Formulae XXIII and XXIV:

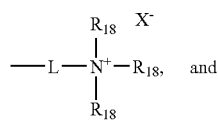 (XXIII)

and

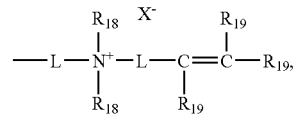 (XXIV)

wherein L can be the same or different and is as defined above for L in Formula VII; $X^-$ is at least a single charged counter ion as defined above for $X^-$ in Formula VII; $R_{18}$ can be the same or different and can be the groups as defined above for $R_1$ in Formula VII; and $R_{19}$ is independently hydrogen or methyl.

A schematic representation of a synthetic method for preparing cationic silicon-containing random copolymers such as poly(dimethylsiloxane) bearing pendant polymerizable cationic groups disclosed herein is provided below.

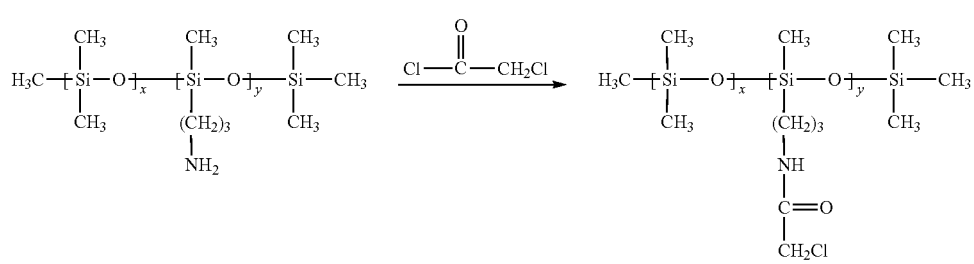 (A)

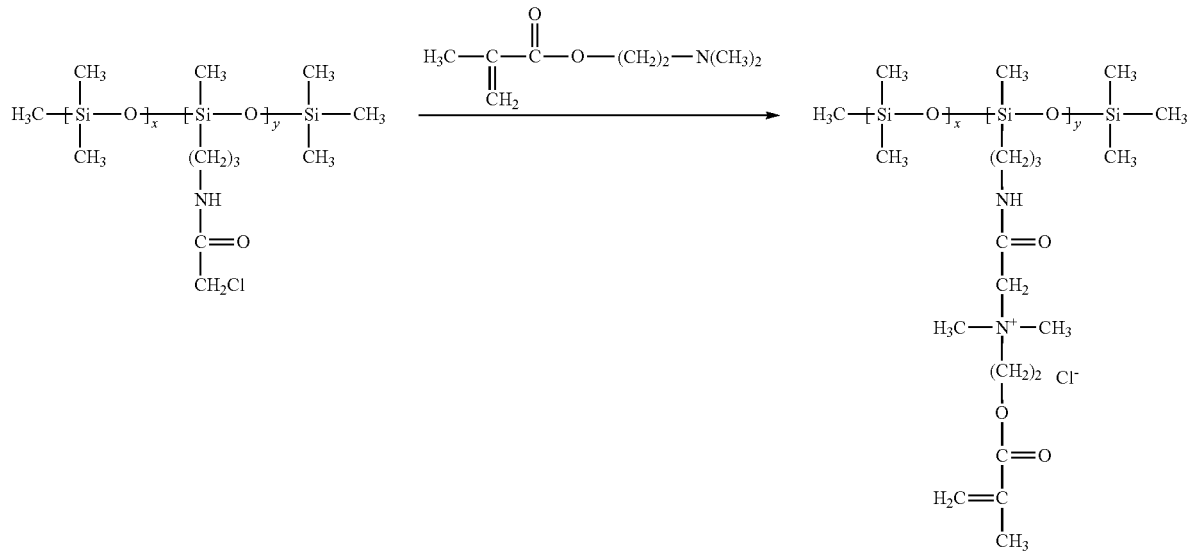
Another synthetic scheme for preparing poly(dimethylsiloxane) bearing pendant cationic groups and pendant polymerizable cationic groups is provided below.
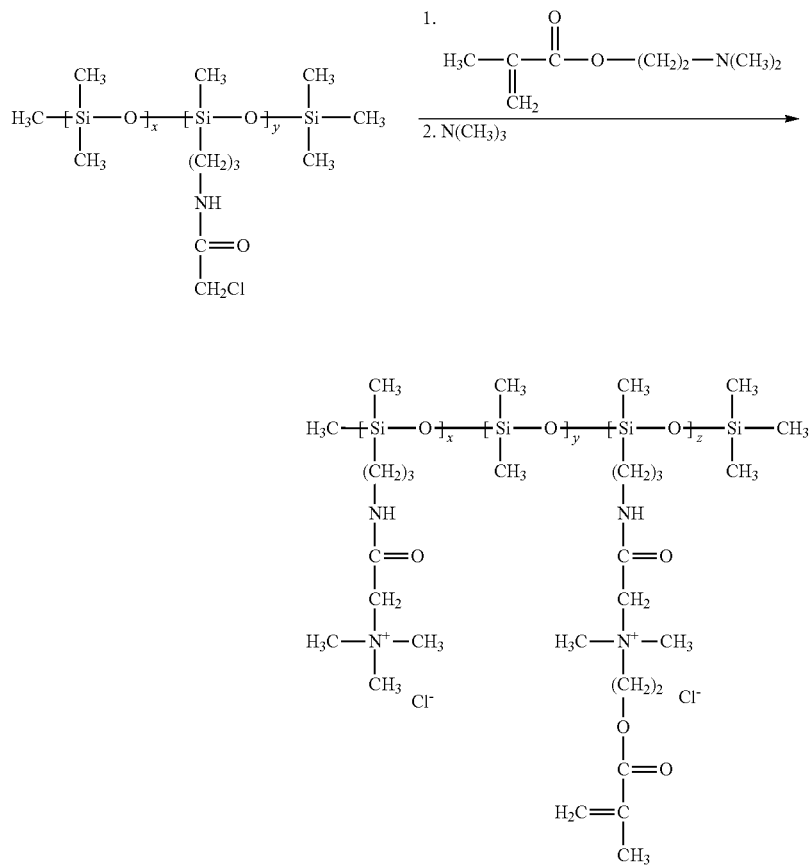

Yet another synthetic scheme for preparing poly(dimethylsiloxane) bearing pendant polymerizable groups and pendant cationic groups is provided below.

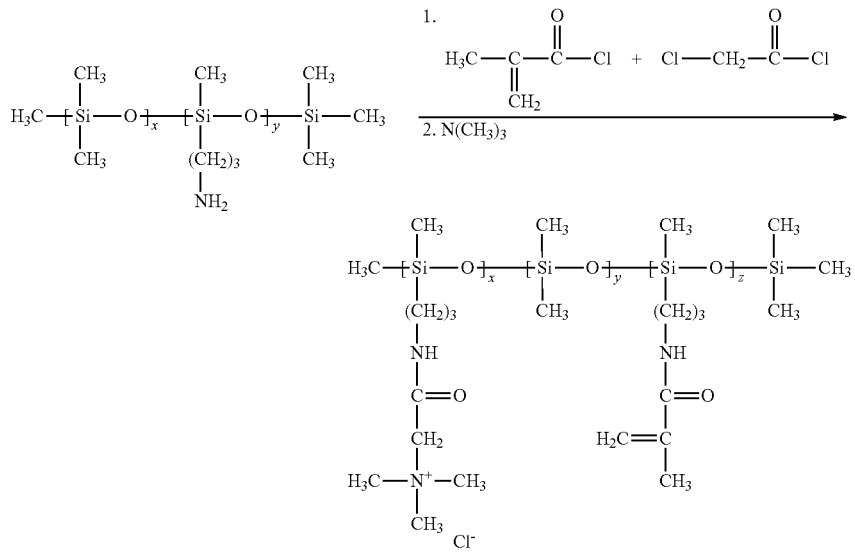

Representative examples of urethanes for use herein include, by way of example, a secondary amine linked to a carboxyl group which may also be linked to a further group such as an alkyl. Likewise the secondary amine may also be linked to a further group such as an alkyl.

Representative examples of carbonates for use herein include, by way of example, alkyl carbonates, aryl carbonates, and the like.

Representative examples of carbamates, for use herein include, by way of example, alkyl carbamates, aryl carbamates, and the like.

Representative examples of carboxyl ureidos, for use herein include, by way of example, alkyl carboxyl ureidos, aryl carboxyl ureidos, and the like.

Representative examples of sulfonyls for use herein include, by way of example, alkyl sulfonyls, aryl sulfonyls, and the like.

Representative examples of alkyl groups for use herein include, by way of example, a straight or branched hydrocarbon chain radical containing carbon and hydrogen atoms of from 1 to about 18 carbon atoms with or without unsaturation, to the rest of the molecule, e.g., methyl, ethyl, n-propyl, 1-methylethyl (isopropyl), n-butyl, n-pentyl, etc., and the like.

Representative examples of fluoroalkyl groups for use herein include, by way of example, a straight or branched alkyl group as defined above having one or more fluorine atoms attached to the carbon atom, e.g., —$CF_3$, —$CF_2CF_3$, —$CH_2CF_3$, —$CH_2CF_2H$, —$CF_2H$ and the like.

Representative examples of ester groups for use herein include, by way of example, a carboxylic acid ester having one to 20 carbon atoms and the like.

Representative examples of ether or polyether-containing groups for use herein include, by way of example, an alkyl ether, cycloalkyl ether, cycloalkylalkyl ether, cycloalkenyl ether, aryl ether, arylalkyl ether wherein the alkyl, cycloalkyl, cycloalkylalkyl, cycloalkenyl, aryl, and arylalkyl groups are as defined herein, e.g., alkylene oxides, poly(alkylene oxide)s such as ethylene oxide, propylene oxide, butylene oxide, poly(ethylene oxide)s, poly(ethylene glycol)s, poly(propylene oxide)s, poly(butylene oxide)s and mixtures or copolymers thereof, an ether or polyether group of the general formula —$R_{20}OR_{21}$, wherein $R_{20}$ is a bond, an alkyl, cycloalkyl or aryl group as defined herein and $R_{21}$ is an alkyl, cycloalkyl or aryl group as defined herein, e.g., in the case of L as defined in Formula VII, the ether-containing group can be —$CH_2CH_2OC_6H_4$— or —$CH_2CH_2OC_2H_4$—; or in the case of $R_1$ and $R_2$ as defined in Formula VII, the ether-containing group can be —$CH_2CH_2OC6H_5$ or —$CH_2CH_2OC_2H_5$, and the like.

Representative examples of amide groups for use herein include, by way of example, an amide of the general formula —$R_{23}C(O)NR_{24}R_{25}$ wherein $R_{23}$, $R_{24}$ and $R_{25}$ are independently $C_1$-$C_{30}$ hydrocarbons, e.g., $R_{23}$ can be an alkylene group, arylene group, cycloalkylene group and $R_{24}$ and $R_{25}$ can be an alkyl groups, aryl group, and cycloalkyl group as defined herein and the like.

Representative examples of amine groups for use herein include, by way of example, an amine of the general formula —$R_{26}NR_{27}R_{28}$ wherein $R_{26}$ is a $C_2$-$C_{30}$ alkylene, arylene, or cycloalkylene and $R_{27}$ and $R_{28}$ are independently $C_1$-$C_{30}$ hydrocarbons such as, for example, alkyl groups, aryl groups, or cycloalkyl groups as defined herein, and the like.

Representative examples of an ureido group for use herein include, by way of example, an ureido group having one or more substituents or unsubstituted ureido. The ureido group preferably is an ureido group having 1 to 12 carbon atoms. Examples of the substituents include alkyl groups and aryl groups. Examples of the ureido group include 3-methylureido, 3,3-dimethylureido, and 3-phenylureido.

Representative examples of alkoxy groups for use herein include, by way of example, an alkyl group as defined above attached via oxygen linkage to the rest of the molecule, i.e., of the general formula —$OR_{29}$, wherein $R_{29}$ is an alkyl, cycloalkyl, cycloalkylalkyl, cycloalkenyl, aryl or an arylalkyl as defined above, e.g., —$OCH_3$, —$OC_2H_5$, or —$OC_6H_5$, and the like.

Representative examples of cycloalkyl groups for use herein include, by way of example, a substituted or unsubstituted non-aromatic mono or multicyclic ring system of about 3 to about 18 carbon atoms such as, for example, cyclopropyl, cyclobutyl, cyclopentyl, cyclohexyl, perhydronapththyl, adamantyl and norbornyl groups bridged cyclic group or spiro-bicyclic groups, e.g., sprio-(4,4)-non-2-yl and the like, optionally containing one or more heteroatoms, e.g., O and N, and the like.

Representative examples of cycloalkylalkyl groups for use herein include, by way of example, a substituted or unsubstituted cyclic ring-containing radical containing from about 3 to about 18 carbon atoms directly attached to the alkyl group which are then attached to the main structure of the monomer at any carbon from the alkyl group that results in the creation of a stable structure such as, for example, cyclopropylmethyl, cyclobutylethyl, cyclopentylethyl and the like, wherein the cyclic ring can optionally contain one or more heteroatoms, e.g., O and N, and the like.

Representative examples of cycloalkenyl groups for use herein include, by way of example, a substituted or unsubstituted cyclic ring-containing radical containing from about 3 to about 18 carbon atoms with at least one carbon-carbon double bond such as, for example, cyclopropenyl, cyclobutenyl, cyclopentenyl and the like, wherein the cyclic ring can optionally contain one or more heteroatoms, e.g., O and N, and the like.

Representative examples of aryl groups for use herein include, by way of example, a substituted or unsubstituted monoaromatic or polyaromatic radical containing from about 5 to about 25 carbon atoms such as, for example, phenyl, naphthyl, tetrahydronapthyl, indenyl, biphenyl and the like, optionally containing one or more heteroatoms, e.g., O and N, and the like.

Representative examples of arylalkyl groups for use herein include, by way of example, a substituted or unsubstituted aryl group as defined above directly bonded to an alkyl group as defined above, e.g., —$CH_2C_6H_5$, —$C_2H_5C_6H_5$ and the like, wherein the aryl group can optionally contain one or more heteroatoms, e.g., O and N, and the like.

Representative examples of fluoroaryl groups for use herein include, by way of example, an aryl group as defined above having one or more fluorine atoms attached to the aryl group.

Representative examples of heterocyclic ring groups for use herein include, by way of example, a substituted or unsubstituted stable 3 to about 15 membered ring radical, containing carbon atoms and from one to five heteroatoms, e.g., nitrogen, phosphorus, oxygen, sulfur and mixtures thereof. Suitable heterocyclic ring radicals for use herein may be a monocyclic, bicyclic or tricyclic ring system, which may include fused, bridged or spiro ring systems, and the nitrogen, phosphorus, carbon, oxygen or sulfur atoms in the heterocyclic ring radical may be optionally oxidized to various oxidation states. In addition, the nitrogen atom may be optionally quaternized; and the ring radical may be partially or fully saturated (i.e., heteroaromatic or heteroaryl aromatic). Examples of such heterocyclic ring radicals include, but are not limited to, azetidinyl, acridinyl, benzodioxolyl, benzodioxanyl, benzofurnyl, carbazolyl, cinnolinyl, dioxolanyl, indolizinyl, naphthyridinyl, perhydroazepinyl, phenazinyl, phenothiazinyl, phenoxazinyl, phthalazinyl, pyridyl, pteridinyl, purinyl, quinazolinyl, quinoxalinyl, quinolinyl, isoquinolinyl, tetrazoyl, imidazolyl, tetrahydroisouinolyl, piperidinyl, piperazinyl, 2-oxopiperazinyl, 2-oxopiperidinyl, 2-oxopyrrolidinyl, 2-oxoazepinyl, azepinyl, pyrrolyl, 4-piperidonyl, pyrrolidinyl, pyrazinyl, pyrimidinyl, pyridazinyl, oxazolyl, oxazolinyl, oxasolidinyl, triazolyl, indanyl, isoxazolyl, isoxasolidinyl, morpholinyl, thiazolyl, thiazolinyl, thiazolidinyl, isothiazolyl, quinuclidinyl, isothiazolidinyl, indolyl, isoindolyl, indolinyl, isoindolinyl, octahydroindolyl, octahydroisoindolyl, quinolyl, isoquinolyl, decahydroisoquinolyl, benzimidazolyl, thiadiazolyl, benzopyranyl, benzothiazolyl, benzooxazolyl, furyl, tetrahydrofurtyl, tetrahydropyranyl, thienyl, benzothienyl, thiamorpholinyl, thiamorpholinyl sulfoxide, thiamorpholinyl sulfone, dioxaphospholanyl, oxadiazolyl, chromanyl, isochromanyl and the like and mixtures thereof.

Representative examples of heteroaryl groups for use herein include, by way of example, a substituted or unsubstituted heterocyclic ring radical as defined above. The heteroaryl ring radical may be attached to the main structure at any heteroatom or carbon atom that results in the creation of a stable structure.

Representative examples of heteroarylalkyl groups for use herein include, by way of example, a substituted or unsubstituted heteroaryl ring radical as defined above directly bonded to an alkyl group as defined above. The heteroarylalkyl radical may be attached to the main structure at any carbon atom from the alkyl group that results in the creation of a stable structure.

Representative examples of heterocyclo groups for use herein include, by way of example, a substituted or unsubstituted heterocylic ring radical as defined above. The heterocyclo ring radical may be attached to the main structure at any heteroatom or carbon atom that results in the creation of a stable structure.

Representative examples of heterocycloalkyl groups for use herein include, by way of example, a substituted or unsubstituted heterocylic ring radical as defined above directly bonded to an alkyl group as defined above. The heterocycloalkyl radical may be attached to the main structure at carbon atom in the alkyl group that results in the creation of a stable structure.

Representative examples of a "polymerizable ethylenically unsaturated organic radicals" include, by way of example, (meth)acrylate-containing radicals, (meth)acrylamide-containing radicals, vinylcarbonate-containing radicals, vinylcarbamate-containing radicals, styrene-containing radicals and the like. In one embodiment, a polymerizable ethylenically unsaturated organic radical can be represented by the general formula:

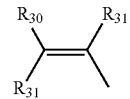

wherein $R_{30}$ is independently hydrogen, fluorine, an alkyl radical having 1 to 6 carbon atoms, or a —CO—Y—$R_{32}$ radical wherein Y is —O—, —S— or —NH— and $R_{32}$ is a divalent alkylene radical having 1 to about 10 carbon atoms; and $R_{31}$ is hydrogen, fluorine or methyl.

The substituents in the 'substituted alkyl', 'substituted alkoxy', 'substituted cycloalkyl', 'substituted cycloalkylalkyl', 'substituted cycloalkenyl', 'substituted arylalkyl', 'substituted aryl', 'substituted heterocyclic ring', 'substituted heteroaryl ring,' 'substituted heteroarylalkyl', 'substituted heterocycloalkyl ring', 'substituted cyclic ring' and 'substituted carboxylic acid derivative' may be the same or different and include one or more substituents such as hydrogen, hydroxy, halogen, carboxyl, cyano, nitro, oxo (=O), thio (=S), substituted or unsubstituted alkyl, substituted or unsubstituted alkoxy, substituted or unsubstituted alkenyl, substituted or unsubstituted alkynyl, substituted or unsubstituted aryl, substituted or unsubstituted arylalkyl, substituted or unsubstituted cycloalkyl, substituted or unsubstituted cycloalkenyl, substituted or unsubstituted amino, substituted or unsubstituted aryl, substituted or unsubstituted heteroaryl, substituted heterocycloalkyl ring, substituted or unsubstituted heteroarylalkyl, substituted or unsubstituted heterocyclic ring, substituted or unsubstituted guanidine, —COORx, —C(O)Rx, —C(S)Rx, —C(O)NRxRy, —C(O)ONRxRy, —NRxCONRyRz, —N(Rx)SORy, —N(Rx)SO2Ry, —(═N—N(Rx)Ry), —NRxC(O)ORy, —NRxRy, —NRxC(O)Ry-, —NRxC(S)Ry —NRxC(S)NRyRz, —SONRxRy-, —SO2NRxRy-, —ORx, —ORxC(O)NRyRz, —ORxC(O)ORy-, —OC(O)Rx, —OC(O)NRxRy, —RxNRyC(O)Rz, —RxORy, -RxC(O)ORy, —RxC(O)NRyRz, —RxC(O)Rx, —RxOC(O)Ry, —SRx, —SORx, —SO2Rx, —ONO2, wherein Rx, Ry and Rz in each of the above groups can be the same or different and can be a hydrogen atom, substituted or unsubstituted alkyl, substituted or unsubstituted alkoxy, substituted or unsubstituted alkenyl, substituted or unsubstituted alkynyl, substituted or unsubstituted aryl, substituted or unsubstituted arylalkyl, substituted or unsubstituted cycloalkyl, substituted or unsubstituted cycloalkenyl, substituted or unsubstituted amino, substituted or unsubstituted aryl, substituted or unsubstituted heteroaryl, 'substituted heterocycloalkyl ring' substituted or unsubstituted heteroarylalkyl, or a substituted or unsubstituted heterocyclic ring.

The above silicone materials are merely exemplary, and other materials for use as cationic substrates that can benefit by being stored in a solution containing an anionic polymer according to the present invention and have been disclosed in various publications and are being continuously developed for use in contact lenses and other medical devices can also be used. For example, other suitable cationic monomer materials have a molecular weight of about 600 grams per mole or less, and include a quaternary ammonium group or a tertiary amine group that can be protonated at a pH value of about 7.2 to about 7.4 (physiological pH values). Illustrative monomers include the tertiary $C_1$-$C_{10}$ alkyl, $C_2$-$C_3$ alkanol, and benzyl aminoethyl or N-morpholinoethyl esters of acrylates and methacrylates such as 2-dimethylaminoethyl methacrylate (DMEAM), 2-N-morpholinoethyl methacrylate (MEM), N,N-diethanolaminoethyl methacrylate, N,N-dimethoxyethylaminoethyl methacrylate, vinyl amine, aminostyrene, 2-vinyl pyridine, 4-vinyl pyridine, N-(2-vinyloxyethyl)piperidine and quaternary ammonium compounds such as 3-trimethylammonium-2-hydroxypropyl methacrylate chloride (TMAHPM), 2-trimethylammoniumethyl methacrylic hydroxide, 2-trimethylammoniumethyl acrylic hydroxide, 2-trimethyl-ammoniummethyl methacrylic chloride, 2-trimethylammoniummethyl acrylic chloride, and 2-methacryloyloxy ethyltrimethylammonium methyl sulfate.

The silicon-containing monomer will be added to the monomeric mixtures in a minor amount, e.g., an amount of no more than about 15 weight percent, based on the total weight of the monomeric mixture. In general, the silicone-containing monomer is present in an amount ranging from about 0.1 to about 15 weight percent, based on the total weight of the monomeric mixture.

Silicone hydrogels of this invention are typically formed by polymerizing a monomeric mixture containing at least a major amount of a non-silicone-containing monomer and a minor amount of a silicone-containing monomer employing conventional polymerization conditions well known by those of ordinary skill in the art, e.g., exposing the monomeric mixture to light radiation, such as visible light or UV radiation, to heat, or both, to induce polymerization. Generally, polymerization can be carried out for about 15 minutes to about 72 hours under an inert atmosphere of, for example, nitrogen or argon. If desired, the resulting polymerization product can be dried under vacuum, e.g., for about 5 to about 72 hours or left in an aqueous solution prior to use.

A polymerization initiator may be included in the monomeric mixture to facilitate the polymerization step. Representative free radical thermal polymerization initiators are organic peroxides such as, for example, acetal peroxide, lauroyl peroxide, decanoyl peroxide, stearoyl peroxide, benzoyl peroxide, tertiarylbutyl peroxypivalate, peroxydicarbonate, and the like and mixtures thereof. Representative UV initiators are those known in the field such as, for example, benzoin methyl ether, benzoin ethyl ether, Darocure 1173, 1164, 2273, 1116, 2959, 3331 (EM Industries) and Igracure 651 and 184 (Ciba-Geigy), and the like and mixtures thereof. Generally, the initiator will be employed in the monomeric mixture at a concentration at about 0.1 to about 5 percent by weight of the total mixture.

Polymerization of the monomeric mixture is generally performed in the presence of a diluent. The diluent is generally removed after polymerization and replaced with water in extraction and hydration protocols well known to those skilled in the art. Representative diluents are diols, alcohols, alcohol/water mixtures, ethyleneglycol, glycerine, liquid polyethylene glycol, low molecular weight linear polyhydroxyethylmethacrylates, glycol esters of lactic acid, formamides, ketones, dialkylsulfoxides, butyl carbitol, and the like and mixtures thereof.

It is also possible to perform the polymerization in the absence of diluent to produce a xerogel. These xerogels may then be hydrated to form hydrogels as is well known in the art.

The monomeric mixtures can further contain a hydrophobic monomer. Suitable hydrophobic monomers include ethylenically unsaturated hydrophobic monomers such as, for example, (meth)acrylate-containing hydrophobic monomers, N-alkyl (meth)acrylamide-containing hydrophobic monomers, vinylcarbonate-containing hydrophobic monomers, vinylcarbamate-containing hydrophobic monomers, fluoroalkyl (meth)acrylate-containing hydrophobic monomers, N-fluoroalkyl (meth)acrylamide-containing hydrophobic monomers, N-fluoroalkyl vinylcarbonate-containing hydrophobic monomers, N-fluoroalkyl vinylcarbamate-containing hydrophobic monomers, styrenic-containing hydrophobic monomers, polyoxypropylene (meth)acrylate-containing hydrophobic monomers and the like and mixtures thereof.

In a preferred embodiment, a hydrophobic monomer is represented by Formula XXV:

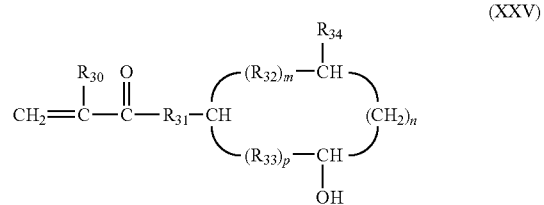

(XXV)

wherein $R_{30}$ is methyl or hydrogen; $R_{31}$ is —O— or —NH—; $R_{32}$ and $R_{34}$ are independently a divalent radical selected from the group consisting of —$CH_2$—, —CHOH— and —$CHR_{35}$—; $R_{34}$ and $R_{35}$ are independently a branched $C_3$-$C_8$ alkyl group; and n is an integer of at least 1, and m and p are independently 0 or an integer of at least 1, provided that the sum of m, p and n is 2, 3, 4 or 5. Representative examples of hydrophobic monomers include, but are not limited to, 4-t-butyl-2-hydroxycyclohexyl methacrylate (TBE); 4-t-butyl-2-hydroxycyclopentyl methacrylate; 4-t-butyl-2-hydroxycyclohexyl methacrylamide (TBA); 6-isopentyl-3-hydroxycyclohexyl methacrylate; and 2-isohexyl-5-hydroxycyclopentyl methacrylamide. Preferred hydrophobic monomers include TBE and TBA.

The hydrophobic monomer will ordinarily be present in the monomeric mixtures in an amount ranging from 0 to about 15 weight percent, based on the total weight of the monomeric mixtures.

The monomeric mixture may also include a crosslinking agent. However, typically, either the non-silicone-containing hydrophilic monomer or silicone-containing monomer functions as a crosslinking agent (a crosslinker being defined as a monomer having multiple polymerizable functionalities) or a separate crosslinker may be employed. Crosslinking agents are known in the art, and representative crosslinking agents include allyl methacrylate and ethylene glycol dimethacrylate (EGDMA). For other acrylic-containing, vinyl-containing and/or styrene-containing hydrophilic monomers, crosslinkers such as methacryloxyethyl vinyl carbonate (HEMAVC), 4-vinylphenyl vinyl carbonate, and 4-vinylphenyl carbamate are used.

The monomeric mixture may also include a strengthening monomer. The term "strengthening monomer" as used here relates to a monomer which can be polymerized with hydrophilic monomers in order to provide polymeric materials with improved physical properties, particularly tear and tensile strength. It is understood that the additional hydrophilic monomer is defined as different from, or exclusive of, the strengthening monomer. The strengthening monomer will ordinarily be present in the monomeric mixture in an amount ranging from about 0.01 to about 20 weight percent and preferably from about 5 to about 10 weight percent, based on the total weight of the monomeric mixture.

The monomeric mixture may include a tinting agent, defined as an agent that, when incorporated in the final lens, imparts some degree of color to the lens. Conventional tinting agents are known in the art, including non-polymerizable agents, or polymerizable agents that include an activated unsaturated group that is reactive with the lens-forming monomers. One preferred example of this latter class is the compound 1,4-bis(4-(2-methacryloxyethyl)phenylamino) anthraquinone, a blue visibility-tinting agent disclosed in U.S. Pat. No. 4,997,897.

The hydrogel materials of the present invention have a water content of greater than 50% water. In one embodiment, the high water content hydrogel materials of the present invention will have a water content of at least about 70% water. In another embodiment, the high water content hydrogel materials of the present invention will have a water content of at least about 80% water. The high water content silicone hydrogels of the present invention can have an oxygen permeability of about 30 Barrers to about 70 Barrers and preferably from about 40 Barrers to about 60 Barrers. It is also preferred that the hydrogel materials have a water contact angle of less than about 90 degrees.

According to various preferred embodiments, the hydrogel materials are suitable for biomedical applications. The terms "shaped articles for use in biomedical applications" or "biomedical devices or materials" mean the hydrogel materials disclosed herein have physicochemical properties rendering them suitable for prolonged contact with living tissue, blood and the mucous membranes.

Generally, contact lenses can be obtained by charging the monomer mixtures to a mold, and then subjecting it to the light radiation or heat to effect curing of the monomer mixture in the mold. Various processes are known for curing a monomeric mixture in the production of contact lenses, including spincasting and static casting. Spincasting methods involve charging the monomer mixture to a mold, and spinning the mold in a controlled manner while exposing the monomer mixture to light. Static casting methods involve charging the monomer mixture between two mold sections, one mold section shaped to form the anterior lens surface and the other mold section shaped to form the posterior lens surface, and curing the monomer mixture by exposure to light. Such methods are described in U.S. Pat. Nos. 3,408,429; 3,660,545; 4,113,224; 4,197,266, and 5,271,875. Additionally, the monomer mixtures may be cast in the shape of rods or buttons, which are then lathe cut into a desired lens shape.

The following examples are provided to enable one skilled in the art to practice the invention and are merely illustrative of the invention. The examples should not be read as limiting the scope of the invention as defined in the claims.

EXAMPLES

Analytical Measurements

Modulus may be measured with an Instron (Model 4502) instrument according to ASTM D-1708a, where the hydrogel copolymer film sample is immersed in borate buffered saline. An appropriate size of the film sample is gauge length 22 mm and width 4.75 mm, where the sample further has ends forming a dogbone shape to accommodate gripping of the sample with clamps of the Instron instrument, and a thickness of 100±50 microns.

The water content of the hydrated films was measured per a gravimetric method. Two sets of fully hydrated lenses containing 5 lenses per set are removed from their storage device. The lenses are blotted with filter paper to remove residual surface water. Each set is then individually weighed to determine the "wet weight". The two sets of lenses are then placed in a 500 to 650 watt microwave oven on a high setting for a period of 10 minutes. The two sets of lenses are then removed from the microwave and each set is weighed individually to determine a "dry weight". The % water content for each set is determined using the equation below. The reported water content represents the average of the two sets.

$$\left(\frac{\text{(Wet weight (mg)} - \text{Dry weight (mg))}}{\text{Wet weight (mg)}}\right) \times 100$$

Oxygen permeability (also referred to as Dk) was determined by the following procedure. Other methods and/or instruments may be used as long as the oxygen permeability values obtained therefrom are equivalent to the described method. The oxygen permeability of silicone hydrogels is measured by the polarographic method (ANSI Z80.20-1998) using an O2 Permeometer Model 201T instrument (Createch, Albany, Calif. USA) having a probe containing a central, circular gold cathode at its end and a silver anode insulated from the cathode. Measurements are taken only on pre-inspected pinhole-free, flat silicone hydrogel film samples of three different center thicknesses ranging from 150 to 600 microns. Center thickness measurements of the film samples may be measured using a Rehder ET-1 electronic thickness gauge.

Generally, the film samples have the shape of a circular disk. Measurements are taken with the film sample and probe immersed in a bath containing circulating phosphate buffered saline (PBS) equilibrated at 35° C.+/−0.2°. Prior to immersing the probe and film sample in the PBS bath, the film sample is placed and centered on the cathode premoistened with the equilibrated PBS, ensuring no air bubbles or excess PBS exists between the cathode and the film sample, and the film sample is then secured to the probe with a mounting cap, with the cathode portion of the probe contacting only the film sample. For silicone hydrogel films, it is frequently useful to employ a Teflon polymer membrane, e.g., having a circular disk shape, between the probe cathode and the film sample. In such cases, the Teflon membrane is first placed on the premoistened cathode, and then the film sample is placed on the Teflon membrane, ensuring no air bubbles or excess PBS exists beneath the Teflon membrane or film sample. Once measurements are collected, only data with correlation coefficient value (R2) of 0.97 or higher should be entered into the calculation of Dk value.

At least two Dk measurements per thickness, and meeting R2 value, are obtained. Using known regression analyses, oxygen permeability (Dk) is calculated from the film samples having at least three different thicknesses. Any film samples hydrated with solutions other than PBS are first soaked in purified water and allowed to equilibrate for at least 24 hours, and then soaked in PHB and allowed to equilibrate for at least 12 hours. The instruments are regularly cleaned and regularly calibrated using RGP standards. Upper and lower limits are established by calculating a +/−8.8% of the Repository values established by William J. Benjamin, et al., The Oxygen Permeability of Reference Materials, Optom Vis Sci 7 (12s): 95 (1997), the disclosure of which is incorporated herein in its entirety:

| Material Name | Repository Values | Lower Limit | Upper Limit |
|---|---|---|---|
| Fluoroperm 30 | 26.2 | 24 | 29 |
| Menicon EX | 62.4 | 56 | 66 |
| Quantum II | 92.9 | 85 | 101 |

Example 1

A base formulation was prepared containing N-vinyl-2-pyrrolidone (NVP) (90 weight percent) and 4-t-butyl-2-hydroxycyclohexyl methacrylate (TBE) (10 weight percent). To this formulation was added ethylene glycol dimethacrylate (EGDMA) (0.15 weight percent), 2-hydroxyethyl methacrylate (HEMA) vinyl carbonate (0.15 weight percent) and a cationic silicone based tris-methacrylate of the general structure as defined in Formula VII (5 weight percent) and Vazo™ 64 (azo bis-isobutylnitrile (AIBN)) (0.5 weight percent). The resultant mixture was thermally cured for about 3 hours. The resulting film had a modulus of 40 g/mm², a water content of 83% and a Dk of 51 barrers.

Example 2

A base formulation was prepared containing NVP (90 weight percent) and TBE (10 weight percent). To this formulation was added HEMA vinyl carbonate (0.30 weight percent), a silicone based methacrylate (15 weight percent) and AIBN (0.5 weight percent). The resultant monomeric mixture was thermally cured for about 3 hours. The resulting film had a modulus of 52 g/mm², a water content of 79% and a Dk of 42 barrers. The silicone based methacrylate used in this example is of the formula:

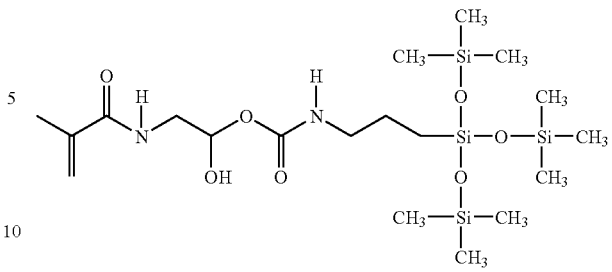

Example 3

A base formulation was prepared containing NVP (90 weight percent) and TBE (5 weight percent). To this formulation was added allyl methacrylate (0.38 weight percent), ethyleneglycol dimethacrylate (EGDMA) (0.38 weight percent), tris(trimethoxysilylpropyl)methacrylate (TRIS-MA) (5 weight percent) and AIBN (0.5 weight percent). The resultant monomeric mixture was thermally cured for about 3 hours. The resulting lens had a modulus of ~50 g/mm², a water content of ~78% and a Dk of ~42 barrers.

Example 4

A base formulation was prepared containing NVP (90 weight percent) and TBE (10 weight percent). To this formulation was added ally methacrylate (0.20 weight percent), ethyleneglycol dimethacrylate (EGDMA) (0.20 weight percent), tris(trimethoxysilylpropyl)methacrylate (TRIS-MA) (5 weight percent) and AIBN (0.5 weight percent). The resultant monomeric mixture was thermally cured for about 3 hours. The resulting lens had a modulus of ~80 g/mm², a water content of ~79% and a Dk of ~45 barrers.

Example 5

A base formulation was prepared containing NVP (90 weight percent) and TBE (10 weight percent). To this formulation was added allyl methacrylate (0.38 weight percent), ethyleneglycol dimethacrylate (EGDMA) (0.38 weight percent), a monomethacryloxypropyl terminated polydimethylsiloxane (5 weight percent) and AIBN (0.5 weight percent). The resultant monomeric mixture was thermally cured for about 3 hours.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A silicone hydrogel formed from a hydrated polymerization product of a monomer mixture comprising (a) a major amount of a non-silicone-containing hydrophilic monomer; and (b) a minor amount of a silicone-containing monomer, wherein the silicone hydrogel has a water content of greater than 50 weight percent.

2. The silicone hydrogel of claim 1, having a water content of greater than about 70 weight percent.

3. The silicone hydrogel of claim 1, having a water content of greater than about 80 weight percent.

4. The silicone hydrogel of claim 1, having an oxygen permeability of about 30 to about 70 Barrers.

5. The silicone hydrogel of claim 1, having an oxygen permeability of about 40 to about 60 Barrers.

6. The silicone hydrogel of claim 1, having a water content of greater than about 70 weight percent, an oxygen permeability of about 40 to about 60 Barrers and a modulus of about 20 $g/m^2$ to about 120 $g/m^2$.

7. The silicone hydrogel of claim 1, having a water content of greater than about 80 weight percent, an oxygen permeability of about 40 to about 60 Barrers and a modulus of about 20 $g/m^2$ to about 120 $g/m^2$.

8. The silicone hydrogel of claim 1, wherein the non-silicone-containing hydrophilic monomer is selected from the group consisting of N,N-dimethylacrylamide, N-vinyl-2-pyrrolidone, 2-hydroxyethyl methacrylate; N-(2-hydroxyethyl)methacrylamide; glyceryl methacrylate; N-methacryloyl glycine; (2-hydroxy-3-methacryloylpropyl)-4-methoxy phenylether and mixtures thereof.

9. The silicone hydrogel of claim 1, wherein the non-silicone-containing hydrophilic monomer is present in the monomer mixture in an amount of greater than about 65 weight percent.

10. The silicone hydrogel of claim 1, wherein the non-silicone-containing hydrophilic monomer is present in the monomer mixture in an amount of greater than about 80 weight percent.

11. The silicone hydrogel of claim 1, wherein the silicone-containing monomer is a tris(trialkylsiloxy)silylalkyl methacrylate-containing monomer.

12. The silicone hydrogel of claim 1, wherein the silicone-containing monomer is a tris(trimethylsiloxy)silylpropyl methacrylate-containing monomer.

13. The silicone hydrogel of claim 1, wherein the silicone-containing monomer is present in the monomer mixture in an amount of less than about 15 weight percent.

14. A contact lens made from a polymerization product of a monomer mixture comprising (a) a major amount of a non-silicone-containing hydrophilic monomer; and (b) a minor amount of a silicone-containing monomer, wherein the contact lens is composed of a silicone hydrogel that has a water content of greater than 50 weight percent.

15. The contact lens of claim 14, having a water content of greater than about 70 weight percent.

16. The contact lens of claim 14, having a water content of greater than about 80 weight percent.

17. The contact lens of claim 14, having an oxygen permeability of about 30 to about 70 Barrers.

18. The contact lens of claim 14, having a water content of greater than about 70 weight percent, an oxygen permeability of about 40 to about 60 Barrers and a modulus of about 20 $g/m^2$ to about 120 $g/m^2$.

19. The contact lens of claim 14, having a water content of greater than about 80 weight percent, an oxygen permeability of about 40 to about 60 Barrers and a modulus of about 20 $g/m^2$ to about 120 $g/m^2$.

20. The contact lens of claim 14, wherein the non-silicone-containing hydrophilic monomer is selected from the group consisting of N,N-dimethylacrylamide, N-vinyl-2-pyrrolidone, 2-hydroxyethyl methacrylate, N-(2-hydroxyethyl) methacrylamide, glyceryl methacrylate, N-methacryloyl glycine, (2-hydroxy-3-methacryloylpropyl)-4-methoxy phenylether and mixtures thereof.

21. The contact lens of claim 14, wherein the non-silicone-containing hydrophilic monomer is present in the monomer mixture in an amount of greater than about 65 weight percent.

22. A silicone hydrogel formed from a hydrated polymerization product of a monomer mixture comprising (a) greater than about 65 weight percent of a non-silicone-containing hydrophilic monomer; and (b) less than about 15 weight percent of a silicone-containing monomer, wherein the silicone hydrogel has a water content of greater than 50 weight percent, an advancing contact angle of no more than about 100 degrees and an oxygen permeability of about 30 to about 70 Barrers.

23. The silicone hydrogel of claim 22, wherein the non-silicone-containing hydrophilic monomer is selected from the group consisting of N,N-dimethylacrylamide, N-vinyl-2-pyrrolidone, 2-hydroxyethyl methacrylate; N-(2-hydroxyethyl)methacrylamide; glyceryl methacrylate; N-methacryloyl glycine; (2-hydroxy-3-methacryloylpropyl)-4-methoxy phenylether and mixtures thereof.

24. The silicone hydrogel of claim 22, having a water content of greater than about 70 weight percent and an oxygen permeability of about 40 to about 60 Barrers.

25. A silicone hydrogel formed from a hydrated polymerization product of a monomer mixture comprising about 90 weight percent N-vinyl-2-pyrrolidone, about 5 to 10 weight percent 4-t-butyl-2-hydroxycyclohexyl methacrylate, about 0.20 to 0.38 weight percent allyl methacrylate, about 0.20 to 0.38 weight percent ethyleneglycol dimethacrylate, about 5 weight percent silicone containing monomer and about 0.5 weight percent azo bis-isobutylnitrile; wherein the silicone hydrogel has a water content of greater than 50 weight percent.

26. The silicone hydrogel of claim 25 wherein the silicone containing monomer is selected from the group consisting of tris(trimethoxysilylpropyl)methacrylate and monomethacryloxypropyl terminated polydimethylsiloxane.

* * * * *